G. G. LENNIG.
APPARATUS FOR MANUFACTURING COCOA.
APPLICATION FILED JULY 17, 1914.
1,209,861.  Patented Dec. 26, 1916.
6 SHEETS—SHEET 4.
FIG. IV.
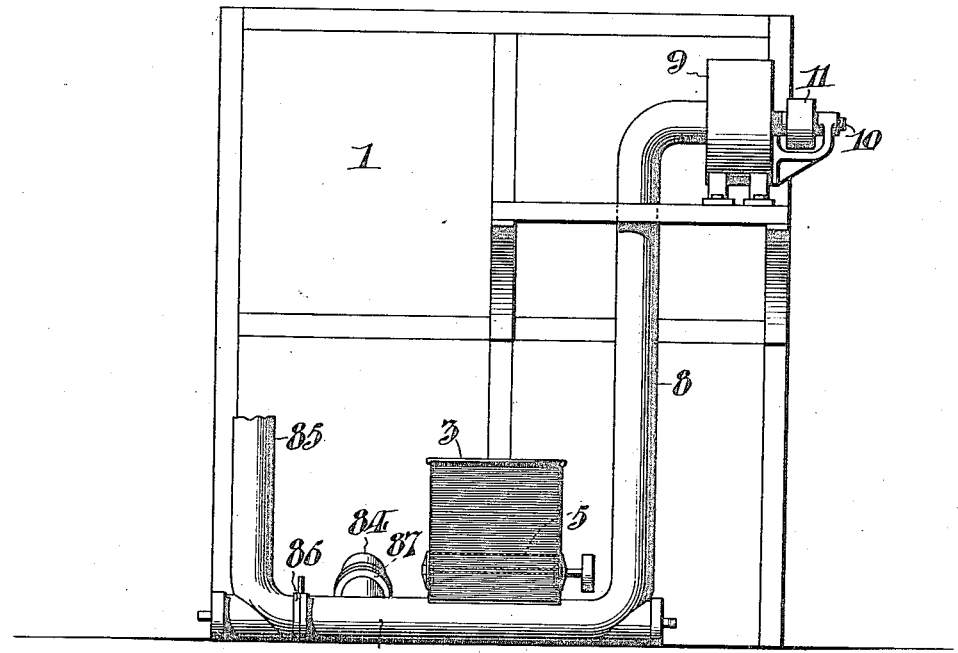
FIG. V.
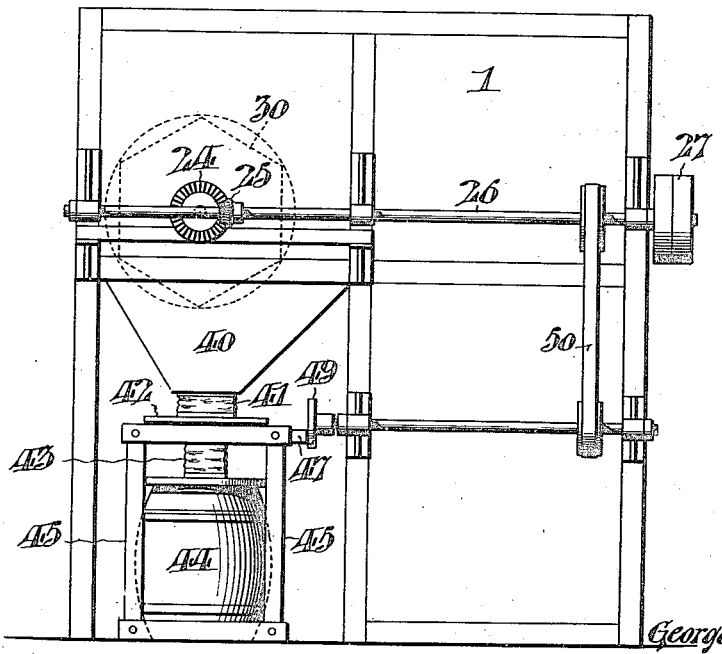
Inventor
George G. Lennig,
Attorneys G. G. LENNIG.
APPARATUS FOR MANUFACTURING COCOA.
APPLICATION FILED JULY 17, 1914.
1,209,861.
Patented Dec. 26, 1916.
6 SHEETS—SHEET 5.
FIG. VI.
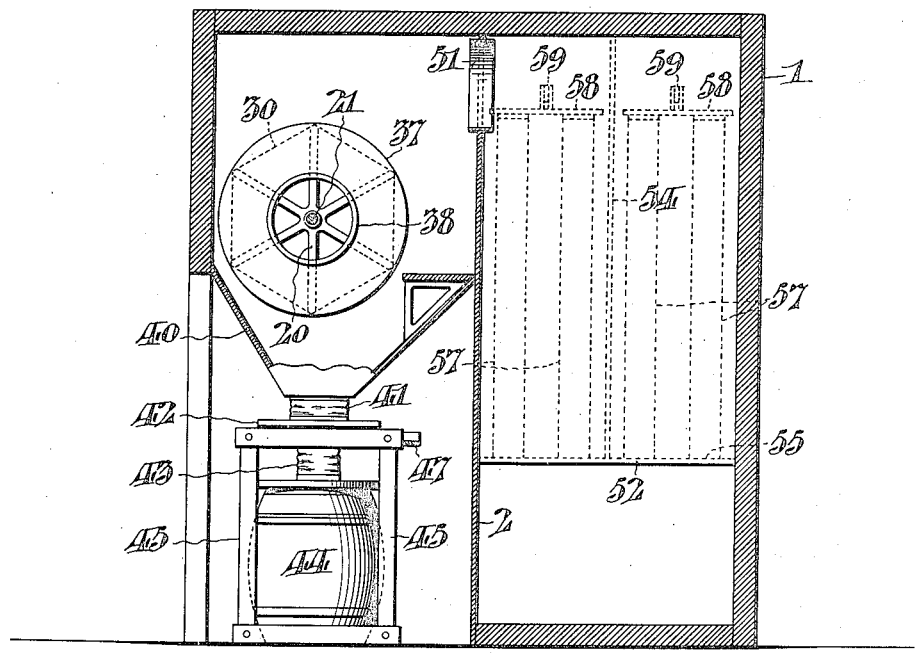
FIG. VII.
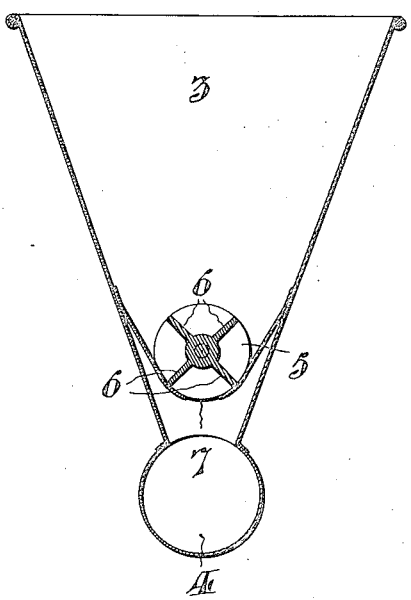
Witnesses
John C. Bergner
James H. Bell
Inventor
George G. Lennig,
by Juley & Paul
Attorneys.

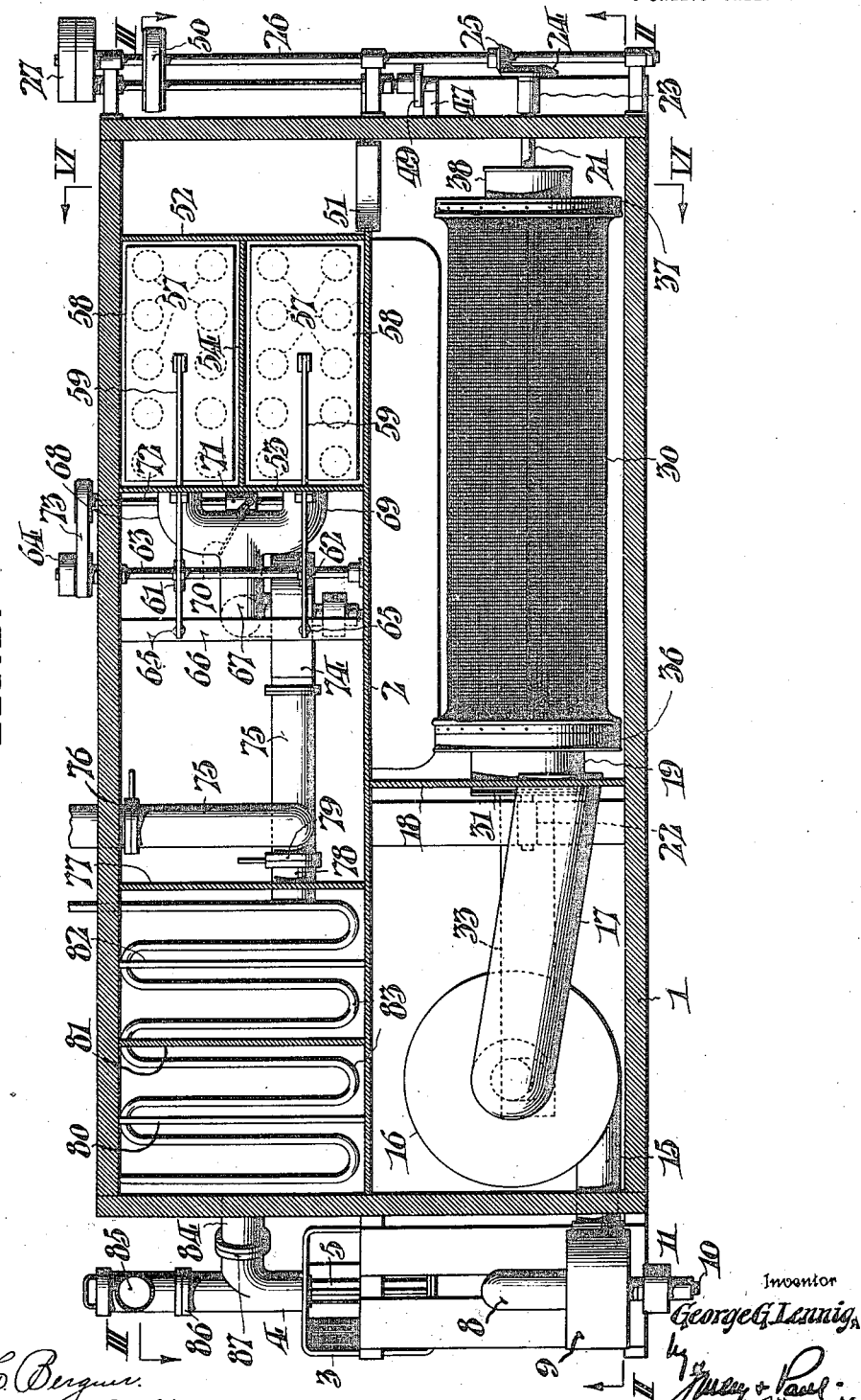

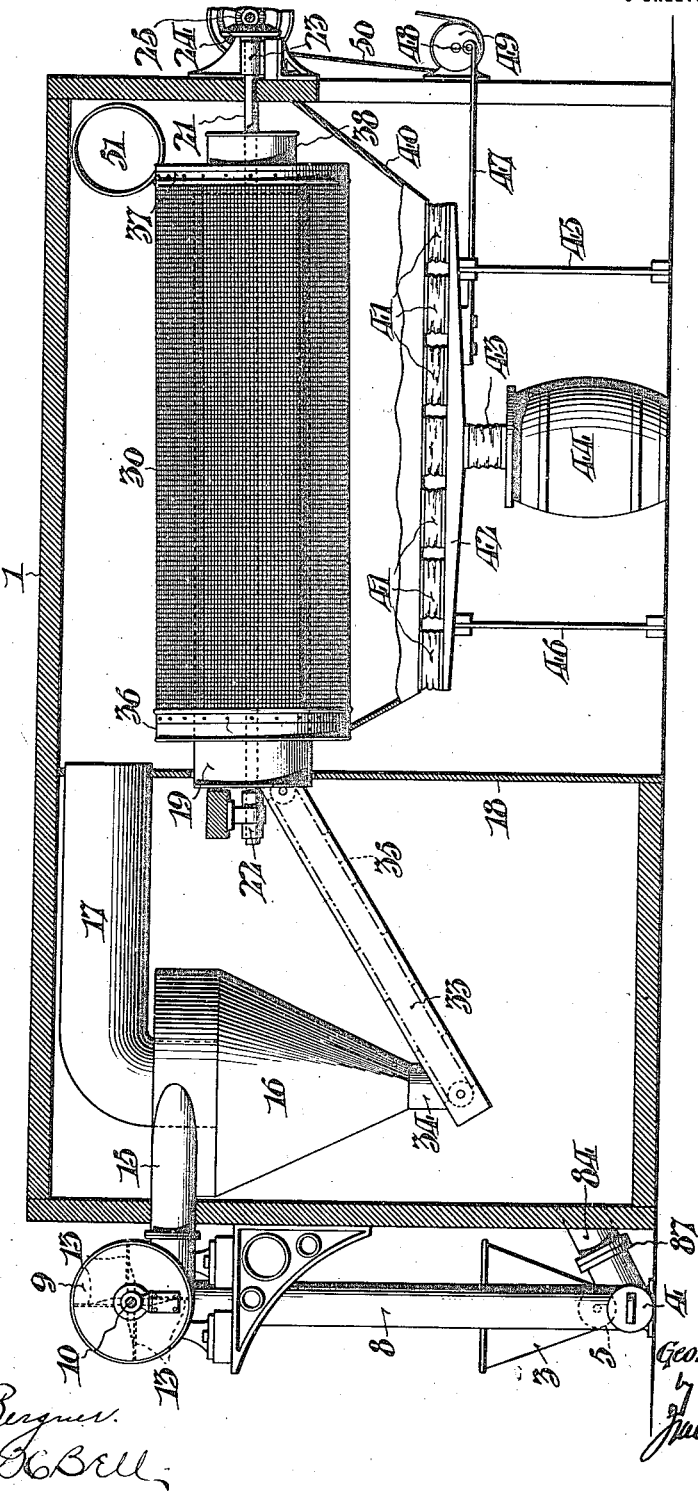

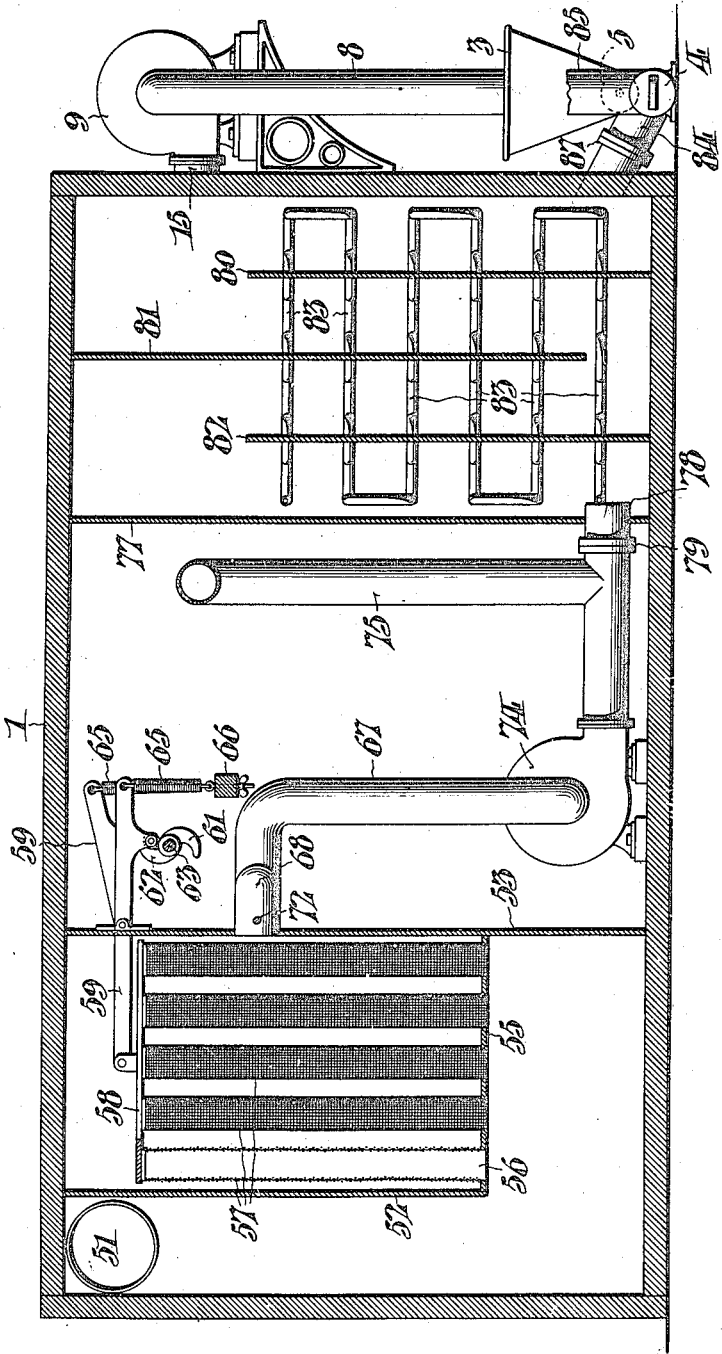

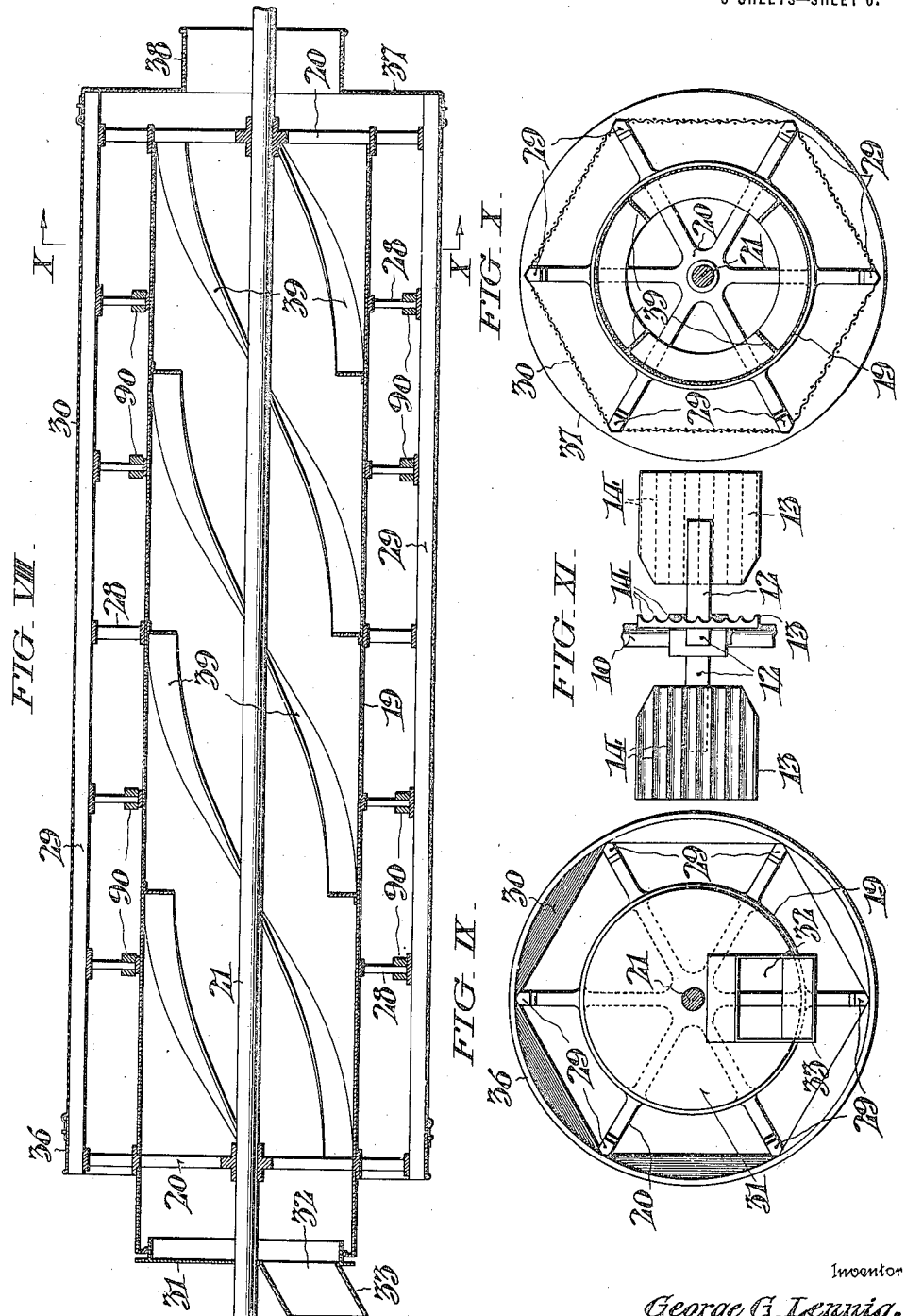

UNITED STATES PATENT OFFICE.

GEORGE GURDON LENNIG, OF PHILADELPHIA, PENNSYLVANIA.

APPARATUS FOR MANUFACTURING COCOA.

1,209,861. Specification of Letters Patent. Patented Dec. 26, 1916.

Continuation in part of application Serial No. 727,104, filed October 22, 1912. This application filed July 17, 1914. Serial No. 851,465.

*To all whom it may concern:*

Be it known that I, GEORGE G. LENNIG, of the city and county of Philadelphia and State of Pennsylvania, have invented certain new and useful Improvements in Apparatus for Manufacturing Cocoa, whereof the following is a specification, reference being had to the accompanying drawings.

The invention relates more particularly to an apparatus which may be used for pulverizing, cooling and bolting cocoa.

An object of the invention is to provide an apparatus wherein the cocoa to be pulverized may be carried through the pulverizer by a current of air, which is preferably cooled, and wherein said pulverizer may be utilized for generating the air current.

A further object of the invention is to provide an apparatus of the above character with a cooling chamber, wherein the pulverized cocoa may be cooled prior to the conveying of the cocoa to the bolting screens.

A still further object of the invention is to provide means for separating the air from the pulverized cocoa prior to the conveying thereof to the cooling chamber, and also to provide means for filtering the air after it is separated from the cocoa to recover therefrom the cocoa carried along in suspension in the air.

A still further object is to provide means whereby the filter for recovering the remaining cocoa from the air is so constructed that a portion of the filter may be rendered inactive, while the cocoa collecting on the walls thereof is recovered.

A still further object of my invention is to provide a circulating cooling system for an apparatus of this type wherein the cocoa is at all times subjected to the cooling medium during its treatment in the apparatus.

A still further object of my invention is to provide a bolting and screening reel having a central cooling chamber surrounded by a screening fabric and means for slowly advancing the cocoa through this chamber prior to the sifting or screening of the same.

A still further object of my invention is to provide means for knocking the supports for the screening fabric on the bolting reel to facilitate the screening operation and thereby obviate clogging.

A still further object of my invention is to provide means for thoroughly agitating the cocoa after screening so as to insure a homogeneous mixture.

These and other objects will in part be obvious, and will in part be hereinafter more fully disclosed.

In the drawings, which show by way of illustration one embodiment of the invention, Figure I, is a horizontal sectional view through the apparatus, showing the several devices used in the apparatus in plan. Fig. II, is a sectional view on the line II, II, of Fig. I. Fig. III, is a sectional view on the line III, III, of Fig. I. Fig. IV, is a view of one end of the apparatus. Fig. V, is a view of the other end of the apparatus. Fig. VI, is a sectional view on the line VI, VI, of Fig. I. Fig. VII, is a sectional view through the supply hopper, showing the feeding controlling means. Fig. VIII, is a longitudinal sectional view through the bolting screen and the cooling chamber. Fig. IX, is an end view of the same. Fig. X, is a sectional view on the line X, X, of Fig. VIII. Fig. XI, is a detail in plan, showing the pulverizing blades and the supporting shaft therefor.

The invention consists generally in providing an apparatus for pulverizing, cooling and bolting cocoa. The ground cocoa is delivered from a hopper to a conveyer, from which it is conveyed to a pulverizer, which is in the form of corrugated fan blades, and this pulverizer performs the double function of pulverizing the cocoa and creating a current of air, which conveys the cocoa through the pulverizer. After leaving the pulverizing apparatus the cocoa is conveyed to a separator, where the air is conveyed from the pulverized cocoa. The cocoa collecting in the separator is conveyed by mechanical means to a cooling chamber formed in a bolting reel. The air leaving the separator passes about the outer wall of this chamber, and aids in cooling the same. In the cooling chamber there is means for stirring the cocoa, so that it becomes thoroughly cooled. After leaving the cooling chamber, the cocoa passes along a bolting screen and the different grades of cocoa passing through the screen are preferably mixed through the aid of a mixer, and delivered to a collecting receptacle. The air passing from the chamber containing the bolting screen and the cooling receptacle, is delivered to a chamber in which are placed filters. These filters operate to remove the remaining cocoa held in suspension in the air, and the air leaving the filter chamber is driven by a suitable fan into a cooling chamber, where it is thoroughly cooled, so that it may be again utilized for conveying the cocoa from the feed hopper to the pulverizing apparatus. If desired, the air may be delivered to the atmosphere, and further air drawn in direct from the atmosphere.

Referring more in detail to the drawings, I have shown a cocoa treating apparatus which consists of a main casing 1, which is divided longitudinally by a partition 2, into two compartments. At one end of the casing 1, there is a receiving hopper 3, into which the ground cocoa to be pulverized and treated is placed. Beneath the hopper 3, is a conveyer pipe 4. The hopper 3, is preferably provided with a rotating feed regulating device 5. This feed regulating device has radially spaced plates 6, 6. The cocoa in the hopper fills the spaces between these plates and upon rotating said feeding-in device, a charge of cocoa may be fed through the opening 7, in the bottom of the hopper into the conveyer pipe 4.

Connected with the conveyer pipe 4, is a vertical conveyer pipe 8, which leads to a combined fan and pulverizing chamber 9. Extending through this chamber is a shaft 10, which is mounted in suitable bearings in the walls of the casing, and is provided with a suitable pulley 11, through which the shaft may be rotated. Extending radially from the shaft are supporting arms 12, which, as herein shown, are four in number. Each of these supporting arms carries pulverizing blades 13. These blades are formed with fluted or corrugated surfaces, which provide sharp ribs 14. The blades are also extended so as to rotate in close contact with the casing. These blades as they rotate serve not only as a pulverizing device for pulverizing the ground cocoa, but also as a fan for creating a circulation of air through the conveyer pipes. The pulverizing device is located preferably adjacent the upper part of the main or outer casing 1. Leading from the pulverizing device is a pipe 15, which enters a separator 16. The pipe 15, is preferably located tangentially of the separator, which is cone shaped. A pipe 17, extends into this separator from the top centrally thereof, and terminates short of the side walls of the cone shaped casing forming the separator. The compartment at one side of the longitudinal partition 2, is further divided by a vertical partition 18. The pipe 17, extends through this partition, and discharges into the chamber formed thereby. Located above the chamber, beyond the partition 18, is a rotating cooling and bolting reel. The cooler consists of a cylindrical metallic casing 19.

This casing is carried by radial arms 20, which are fixed to a shaft 21, mounted in bearings 22, and 23, supported by the main casing. The shaft 21, extends through the end wall of the main casing, and is provided with a bevel gear 24, which meshes with a bevel gear 25, on a shaft 26, driven by a suitable pulley 27. Mounted on the casing 19, forming the cooling chamber are radially extending frames 28, which are spaced along the casing, and these frames support bars 29, which extend transversely of the casing. The radial arms of most of the frames 28, are provided with weighted collars 90, which are free to slide thereon. As the reel rotates, these weighted collars drop by gravity against the supporting bars 29, thereby knocking the same and vibrating the surrounding screening cloth. This serves to facilitate the screening operation and at the same time to obviate any tendency to clogging. Secured to the bars 29, is a bolting cloth 30. The receiving end of the casing 19, of the cooling chamber is closed by a cap 31, which has a receiving opening 32. A conveyer pipe 33, connects the lower end 34, of the separator 16, with the opening 32. Located in this conveyer pipe is an endless conveyer 35, which is driven by any suitable connection. This endless conveyer carries the pulverized cocoa, accumulating at the bottom of the separator, up and discharges the same into the cooling chamber formed by the casing 19. This cooling chamber is mounted so that the same inclines upwardly from its receiving end toward its delivering end. The cap 31, is held from rotation by being attached to the conveyer 33, and the casing of the cooling chamber revolves about this cap. There is also a circular end ring 36, to which the bolting material is secured at one end of the bolting screen, and a circular cap 37, at the other end thereof. The cap 37, carries a projecting collar 38. Located within the casing 19, are spirally arranged angle plates 39. These spiral plates project from the inner surface of the casing, and as the casing rotates, the cocoa will be carried up by said plates, and allowed to fall, which thoroughly stirs the cocoa and cools it as it passes through this cooling chamber. The ends of the bolting screen are open, so that the air entering the chamber containing the screen from the pipe 17, may pass in and about this bolting screen and contact with the outer surface of the casing 19.

The cocoa which is delivered into the cooling chamber is gradually carried toward the right hand end as viewed in Fig. II, and will be delivered on to the bolting screen at the high end thereof. The screen rotates with the shaft 21, and as the cocoa moves along the screen, it will pass through the screening material, different grades of cocoa passing through the screen one after the other. The cocoa passing through the screen is received by a hopper 40, and this hopper serves to effectively close the bottom of the chamber which contains the bolting screen. The bottom of the hopper is formed with a plurality of openings and connected with each opening is a flexible tubular spout 41. These spouts are in turn connected with a receiving table 42, which has a single flexible spout 43, through which the cocoa received on to the table may be delivered to a collecting receptacle 44, herein shown in the form of a barrel. The table 42, is carried by flexible supports 45, and 46. The arm 47, is fixed to the table and is attached to a crank 48, on a disk 49, which is operated by a belt connection 50, with the shaft 26. As this disk 49, rotates, the arm 47, will be moved back and forth, and this will impart a vibrating movement to the table 42. The upper face of this table is inclined from each end toward the central delivering opening, and the rocking of the table causes the different grades of cocoa, accumulating in the flexible spouts discharging on to the table, to be thoroughly mixed and delivered to the barrel or receptacle 44. The screenings pass out of the end of the bolting screen.

The partition 2, is provided with an opening 51. A vertical partition 52, together with a vertical partition 53, forms a filter chamber, which is divided into two compartments by a partition 54. The bottom wall 55, is provided with a series of openings 56, with each of which is connected a tubular cloth filter 57. The upper ends of these tubular cloth filters are connected to a supporting plate 58. There is a supporting plate 58, for each chamber. Each plate is connected to a supporting lever 59, which extends through the partition 53, and each lever carries a roller adapted to coöperate with the cams 61, and 62, respectively, on the shaft 63, which is rotated by a suitable belt wheel 64. The levers extend beyond their rollers and each lever is connected with a spring 65, and these springs are connected to a cross bar 66. The springs depress the outer ends of the levers, holding the rollers in contact with the cams, and also holding the plates 58 normally in raised position. As the shaft 63, rotates, the outer end of the lever is raised, which lowers the plate, and as the end of the cam passes from the roller, the spring will quickly raise the plate to its extreme upper position. This raising of the plate produces a knocking motion, which jars the cocoa from the inner walls of the filter tubes. The air passing into the filter chamber carries suspended therein some of the finer particles of the cocoa. The air enters the openings at the bottom of the tubes, and as the upper ends of the tubes are closed, it escapes from these tubes only by passing through the walls thereof. A conveyer 67, has a branch pipe therein; one branch 68, connects with one filter compartment, while the other branch 69, connects with the other filter compartment.

Located in the conveyer pipe 67, where the branches 68, and 69, join the same, is a valve 70, which is pivoted. Said valve is swung by a cam groove in a drum 71, mounted on a shaft 72, which is operated from a belt connection 73, with a pulley on the shaft 63. This drum is so constructed that the valve is thrown first to one side, and then the other, thus cutting off the air from the filter compartments. The purpose of this valve is to render idle the filter compartment wherein the filter tubes are being knocked to remove the cocoa therefrom, so as to permit the cocoa to freely drop from the walls of the tube, and accumulate in the bottom of the filter chamber. Inasmuch as the shaft 72, is operated in timing with the shaft 63, this may be readily accomplished. First one compartment and then the other will be operated for filtering the cocoa from the air. A blower 74, is connected with the pipe 67. The air passing from the blower 74, may be discharged through a pipe 75 to the atmosphere. This pipe has a damper or valve 76 therein. A vertical partition 77, extending across the casing from one side wall to the longitudinal partition 2, forms a cooling chamber for cooling the air delivered into this chamber. The pipe 78, leads through the partition 77, and discharges into this chamber. Said pipe may be provided with a damper or valve 79. This chamber is divided into compartments by baffle plates 80, 81 and 82. The refrigerating pipes 83, extend back and forth in the chamber, and the air passing around the baffle plates will be thoroughly cooled or chilled. A pipe 84, leads from this cooling chamber to the conveyer pipe 4.

From the above construction it will be apparent that the ground cocoa can be placed in the hopper 3, and may be fed to the conveyer pipe 4, through a feed controlling device, and as the ground cocoa drops into the conveyer pipe, it will meet the cool current of air passing therethrough, and will be conveyed thereby to the pulverizing device contained in the casing 9. The rotating blades contacting with the ground cocoa thoroughly pulverizes the same, and forces the pulverized cocoa through the pipe 15, into the separator. The air entering the separator tangentially circulates around the same and out through the pipe 17, while the cocoa will be to a large extent separated from the air, and will accumulate in the bottom of the separator. The conveyer belt carries the cocoa through the conveyer pipe 33, and discharges the same into the cooling chamber. As the cocoa travels slowly through the cooling chamber, it will be stirred and cooled, and then delivered on to the bolting screen and as it passes along the rotating bolting screen, the cocoa will pass through the screening cloth and will accumulate in the collecting hopper beneath the same, and finally on the receiving table 42, where the different grades of cocoa are mixed and discharged into the receiving barrel. The screenings passing along the bolting screen will be discharged from the end thereof. The air which passes through and about the bolting screen is more or less charged with the very fine particles of cocoa. This air is carried up through the filter tubes and drawn therefrom by the blower, and the air may be finally discharged either to the atmosphere or into the cooling chamber and reused. The filter cells or tubes are knocked intermittently to discharge the cocoa from the side walls thereof and during this knocking action, the air is diverted into the other compartment, which is idle at this time. This collects the suspended cocoa from the air, which accumulates in the bottom of the filter chamber. From the above description it will be apparent that I have provided a cocoa treating apparatus, wherein the cocoa may be pulverized and thoroughly bolted.

When the air is discharged to the atmosphere through the pipe 75, then air is taken into the pipe 4, from a pipe 85, also leading to the atmosphere, and having a damper 86. If the weather is sufficiently cool the use of the refrigerating chamber is unnecessary, and is disconnected from the apparatus by closing dampers 79, and 87, so that atmospheric air may be received and discharged from the device by opening the respective dampers 76, and 86.

It is obvious that minor changes in the details of construction and arrangement of parts may be made without departing from the spirit of the invention as set forth in the appended claims.

Having thus described my invention, I claim:

1. An apparatus for manufacturing cocoa including in combination means for pulverizing the cocoa, means for cooling the pulverized cocoa, and means for bolting said cooled pulverized cocoa.

2. An apparatus for manufacturing cocoa including in combination a conveyer pipe through which the cocoa is conveyed by air, means for pulverizing the cocoa as it is conveyed by said air through said pipe, means for separating the air from the cocoa, and means for bolting the cocoa.

3. An apparatus for manufacturing cocoa including in combination a conveyer pipe through which the cocoa is conveyed by air, means for pulverizing the cocoa as it is conveyed by said air through said pipe, means for separating the air from the cocoa, means for cooling the cocoa, and means for bolting the cocoa.

4. An apparatus for manufacturing cocoa including in combination a conveyer pipe through which the cocoa is conveyed by air, means for pulverizing the cocoa, a separator for separating the air from the cocoa, a cooling chamber through which the cocoa is conveyed from the separator, and a bolting screen for receiving and bolting the cocoa.

5. An apparatus for manufacturing cocoa including in combination a conveyer pipe through which the cocoa is conveyed by air, means for pulverizing the cocoa, a separator for separating the air from the cocoa, a cooling chamber through which the cocoa is conveyed from the separator, a bolting screen for receiving and bolting the cocoa, and means for rotating said cooling chamber and bolting screen, said cooling chamber having means for stirring the cocoa and for conveying the same through the chamber as it is rotated.

6. An apparatus for manufacturing cocoa including in combination a conveyer pipe through which the cocoa is conveyed by air, means for pulverizing the cocoa, a separator for separating the air from the cocoa, a cooling chamber through which the cocoa is conveyed from the separator, a bolting screen for receiving and bolting the cocoa, and means for filtering the air after it is separated from the cocoa for collecting the cocoa still held in suspension in the air.

7. An apparatus for manufacturing cocoa including in combination a conveyer pipe through which the cocoa is conveyed by air, means for pulverizing the cocoa, a separator for separating the air from the cocoa, a cooling chamber through which the cocoa is conveyed from the separator, a bolting screen for receiving and bolting the cocoa, means for filtering the air after it is separated from the cocoa for collecting the cocoa still held in suspension in the air, said filtering means including flexible tubes through the walls of which the air is filtered, and means for knocking the walls of the filter for dislodging the cocoa therefrom.

8. An apparatus for manufacturing cocoa including in combination a conveyer pipe through which the cocoa is conveyed by air, means for pulverizing the cocoa, a separator for separating the air from the cocoa, a cooling chamber through which the cocoa is conveyed from the separator, a bolting screen for receiving and bolting the cocoa, means for filtering the air after it is separated from the cocoa for collecting the cocoa still held in suspension in the air, said filtering means being formed in separate compartments, means for diverting the air from one compartment to the other, and means for dislodging the cocoa from the walls of the filters in the idle compartment.

9. An apparatus for manufacturing cocoa including in combination conveyer pipes through which the ground cocoa is conveyed by air, means for separating the cocoa from the air, means for bolting cocoa, and filtering means through which the air is caused to pass for separating the cocoa still held in suspension from the air.

10. An apparatus for manufacturing cocoa including in combination conveyer pipes through which the ground cocoa is conveyed by air, means for separating the cocoa from the air, means for bolting cocoa, filtering means through which the air is caused to pass for separating the cocoa still held in suspension from the air, said filtering means including separate compartments, filter tubes arranged in said compartments through the walls of which the air passes.

11. An apparatus for manufacturing cocoa including in combination conveyer pipes through which the ground cocoa is conveyed by air, means for separating the cocoa from the air, means for bolting cocoa, filtering means through which the air is caused to pass for separating the cocoa still held in suspension from the air, said filtering means including separate compartments, filter tubes arranged in said compartments through the walls of which the air passes, means for diverting the air from one compartment into the other, and means for knocking the walls of the filters in the idle compartment.

12. An apparatus for manufacturing cocoa including in combination means for pulverizing the cocoa, a cylindrical cooling chamber, a conveyer for conveying the cocoa to said chamber, a bolting screen surrounding said chamber, means for rotating said chamber and said screen, and means located within said chamber for stirring the cocoa and causing the same to pass therethrough.

13. An apparatus for manufacturing cocoa including in combination means for pulverizing the cocoa, a cylindrical cooling chamber, a conveyer for conveying the cocoa to said chamber, a bolting screen surrounding said chamber, means for rotating said chamber and said screen, and spirally arranged ribs carried by the inner surface of said chamber for stirring the cocoa and for feeding the same through the chamber.

14. An apparatus for manufacturing cocoa including a receiving hopper for the ground cocoa, a pulverizer, a conveyer pipe leading from the hopper to said pulverizer, means for controlling the feed of the cocoa from the hopper into said conveyer, said pulverizer including means for creating a current of air which conveys the ground cocoa to the pulverizer, a separator for separating the air from the cocoa, and a bolting screen for bolting the cocoa.

15. An apparatus for manufacturing cocoa including a receiving hopper for the ground cocoa, a pulverizer, a conveyer pipe leading from the hopper to said pulverizer, means for controlling the feed of the cocoa from the hopper into said conveyer, said pulverizer including means for creating a current of air which conveys the ground cocoa to the pulverizer, a separator for separating the air from the cocoa, a cooling chamber, a conveyer for conveying the cocoa from the separator to the cooling chamber, and a bolting screen for receiving the cocoa from the cooling chamber.

16. An apparatus for manufacturing cocoa including a receiving hopper for the ground cocoa, a pulverizer, a conveyer pipe leading from the hopper to said pulverizer, means for controlling the feed of the cocoa from the hopper into said conveyer, said pulverizer including means for creating a current of air which conveys the ground cocoa to the pulverizer, a separator for separating the air from the cocoa, a cooling chamber, a conveyer for conveying the cocoa from the separator to the cooling chamber, and a bolting screen for receiving the cocoa from the cooling chamber, means for receiving the cocoa passing through the bolting screen, and for mixing and delivering the same to a receiving receptacle.

17. An apparatus for manufacturing cocoa including a receiving hopper for the ground cocoa, a pulverizer, a conveyer pipe leading from the hopper to said pulverizer, means for controlling the feed of the cocoa from the hopper into said conveyer, said pulverizer including means for creating a current of air which conveys the ground cocoa to the pulverizer, a separator for separating the air from the cocoa, a cooling chamber, a conveyer for conveying the cocoa from the separator to the cooling chamber, a bolting screen for receiving the cocoa from the cooling chamber, and a filter for receiving the air from the separator for separating the cocoa still held in suspension from the air.

18. An apparatus for manufacturing cocoa including a receiving hopper for the ground cocoa, a pulverizer, a conveyer pipe leading from the hopper to said pulverizer, means for controlling the feed of the cocoa from the hopper into said conveyer, said pulverizer including means for creating a current of air which conveys the ground cocoa to the pulverizer, a separator for separating the air from the cocoa, a cooling chamber, a conveyer for conveying the cocoa from the separator to the cooling chamber, a bolting screen for receiving the cocoa from the cooling chamber, a filter for receiving the air from the separator for separating the cocoa still held in suspension from the air, and means for cooling the air after the same passes through the filter and for delivering the same again to the conveyer pipe receiving the cocoa from the hopper.

19. An apparatus for manufacturing cocoa including in combination means for pulverizing the cocoa, a cylindrical cooling chamber, a conveyer for conveying the cocoa to said chamber, a bolting screen surrounding said chamber, means for rotating said chamber and said screen, spirally arranged ribs carried by the inner surface of said chamber for stirring the cocoa and for feeding the same through the chamber, and means for vibrating the said screen.

20. An apparatus for manufacturing cocoa including in combination, means for pulverizing the cocoa, a bolting reel comprising a central cooling chamber, means for conveying the cocoa to the said chamber, a spiral for slowly advancing the cocoa through the said chamber, a bolting screen surrounding the said chamber, radial supporting arms for the said screen, weighted collars loosely mounted on the said arms and adapted to knock and vibrate the said screen during rotation, and means for rotating the said reel.

In testimony whereof, I have hereunto signed my name at Philadelphia, Pennsylvania, this fifteenth day of July 1914.

GEORGE GURDON LENNIG.

Witnesses:
    JAMES H. BELL,
    E. L. FULLERTON.